US008936318B2

(12) United States Patent
Sasaki et al.

(10) Patent No.: US 8,936,318 B2
(45) Date of Patent: Jan. 20, 2015

(54) VEHICLE SEAT

(71) Applicant: NHK Spring Co. Ltd., Yokohama-shi (JP)

(72) Inventors: Yoshitaka Sasaki, Yokohama (JP);
Yusuke Ohkawara, Yokohama (JP);
Hiroaki Inaba, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 150 days.

(21) Appl. No.: 13/648,155

(22) Filed: Oct. 9, 2012

(65) Prior Publication Data

US 2013/0088066 A1    Apr. 11, 2013

(30) Foreign Application Priority Data

Oct. 11, 2011 (JP) .................................. 2011-224087

(51) Int. Cl.
*B60N 2/44* (2006.01)
*B60N 2/16* (2006.01)
*B60N 2/60* (2006.01)
*B60N 2/06* (2006.01)

(52) U.S. Cl.
CPC ................ *B60N 2/16* (2013.01); *B60N 2/6009* (2013.01); *B60N 2/06* (2013.01)
USPC ............... 297/463.2; 297/452.38; 297/344.15

(58) Field of Classification Search
CPC ........... A41B 97/00; A47C 3/00; A47C 7/002
USPC ......... 297/463.1, 463.2, 182, 452.38, 344.15, 297/344.17
See application file for complete search history.

(56) References Cited

U.S. PATENT DOCUMENTS

| | | | |
|---|---|---|---|
| 8,287,048 B2 * | 10/2012 | Smith et al. ................ | 297/463.1 |
| 2004/0090100 A1 * | 5/2004 | Igarashi .................... | 297/344.15 |
| 2010/0264710 A1 * | 10/2010 | Lindsay ....................... | 297/313 |

FOREIGN PATENT DOCUMENTS

| | | | | |
|---|---|---|---|---|
| JP | 2006-82581 A | | 3/2006 | |
| JP | 2006082581 | * | 3/2006 | ............... B60N 2/18 |

* cited by examiner

*Primary Examiner* — David R Dunn
*Assistant Examiner* — Jody Giacoman
(74) *Attorney, Agent, or Firm* — Knobbe Martens Olson & Bear LLP (57) ABSTRACT

A vehicle seat including: a moving member that moves as one with a rail configured to move in a vehicle front-rear direction; a seat cushion that is coupled to the moving member through a lifter mechanism, is disposed above the rail, and is configured such that the top-bottom direction position of the seat cushion is capable of being adjusted by the lifter mechanism; and a gap concealing member that extends between a vehicle rear direction lower portion of the seat cushion and the rail to conceal a gap between the seat cushion and the rail. The gap concealing member is integrally formed from the top end portion to the bottom end portion.

10 Claims, 7 Drawing Sheets

VEHICLE SEAT

CROSS-REFERENCE TO RELATED APPLICATION

This application claims priority under 35 USC 119 from Japanese Patent Application No. 2011-224087 filed on Oct. 11, 2011, the disclosure of which is incorporated by reference herein.

BACKGROUND

1. Technical Field

The present invention relates to a vehicle seat equipped with a gap concealing member for concealing a gap between a seat cushion and a rail.

2. Related Art

A lower shield (gap concealing member) of a vehicle seat disclosed in Japanese Patent Application Laid-Open (JP-A) No. 2006-82581 is provided at a rear direction lower portion of a seat. The lower shield includes a shield main body, a coupling plate provided above the shield main body, and a rail cover member provided below the shield main body. The seat vehicle rear direction lower portion is concealed by the lower shield.

However, in the lower shield, the shield main body and the coupling plate are coupled together through a first hinge, and the shield main body and the rail cover member are coupled together through a second hinge.

Therefore when the seat moves from above to below, the first hinge projects out towards the vehicle rear, and the shield main body and the coupling plate bend at the location of the first hinge. Since the first hinge is thereby rendered noticeable there is a detrimental effect to the aesthetics of the lower shield.

SUMMARY

In consideration of the above circumstances, the present invention accordingly provides a vehicle seat capable of enhancing the visual appearance of a gap concealing member that conceals a gap between a seat cushion and a rail.

A vehicle seat of a first aspect of the present invention includes: a moving member that moves as one with a rail configured to move in a vehicle front-rear direction; a seat cushion that is coupled to the moving member through a lifter mechanism, is disposed above the rail, and is configured such that the top-bottom direction position of the seat cushion is capable of being adjusted by the lifter mechanism; and a gap concealing member that extends between a vehicle rear direction lower portion of the seat cushion and the rail to conceal a gap between the seat cushion and the rail. A top end portion of the gap concealing member is rotatably coupled to the seat cushion and a bottom end portion of the gap concealing member is coupled to the moving member so as to be capable of relative movement with respect to the moving member, or a top end portion of the gap concealing member is coupled to the seat cushion so as to be capable of relative movement with respect to the seat cushion and a bottom end portion of the gap concealing member is rotatably coupled to the moving member. The gap concealing member is integrally formed from the top end portion to the bottom end portion.

In the vehicle seat of the first aspect of the present invention, the moving member is configured so as to be capable of moving as one with the rail in the vehicle front-rear direction. The seat cushion is disposed above the rail and the seat cushion is coupled to the moving member through the lifter mechanism. The vehicle front-rear direction position of the seat cushion is accordingly adjusted by moving the rail in the vehicle front-rear direction, and the top-bottom direction position of the seat cushion is adjusted with the lifter mechanism.

A gap between the seat cushion and the rail is concealed by the gap concealing member that extends between the vehicle rear direction lower portion of the seat cushion and the rail. The gap concealing member accordingly suppresses the gap between the seat cushion and the rail from being noticed.

A top end portion of the gap concealing member is rotatably coupled to the seat cushion or coupled to the seat cushion so as to be capable of relative movement with respect to the seat cushion. When the top end portion of the gap concealing member is rotatably coupled to the seat cushion, the bottom end portion of the gap concealing member is coupled to the moving member so as to be capable of relative movement with respect to the moving member. Therefore, when the top-bottom direction position of the seat cushion is being adjusted, the top end portion of the gap concealing member moves together with the seat cushion and the bottom end portion of the gap concealing member relatively moves with respect to the moving member. Movement (swinging) of the gap concealing member to follow movement of the seat cushion is thereby permitted, and the gap concealing member swings to accompany movement of the seat cushion.

However, when the top end portion of the gap concealing member is coupled to the seat cushion so as to be capable of relative movement with respect to the seat cushion, the bottom end portion of the gap concealing member is rotatably coupled to the moving member. Hence when the top-bottom direction position of the seat cushion is being adjusted, movement of the seat cushion is permitted by the seat cushion relatively moving with respect to the top end portion of the gap concealing member.

However, the gap concealing member is integrally formed from the top end portion to the bottom end portion. Therefore, when the gap concealing member swings to accompany movement of the seat cushion, or when the seat cushion relatively moves with respect to the top end portion of the gap concealing member, the aesthetics of the gap concealing member can be enhanced since the gap concealing member does not bend between the top end portion and the bottom end portion.

According to the vehicle seat of the first exemplary embodiment of the present invention, the aesthetics of the gap concealing member that conceals the gap between the seat cushion and the rail can be enhanced.

A vehicle seat of a second aspect of the present invention is the first aspect of the present invention, wherein the bottom end portion of the gap concealing member is disposed towards a vehicle front with respect to the top end portion of the gap concealing member.

In the vehicle seat of the second aspect, due to disposing the bottom end portion of the gap concealing member towards the vehicle front with respect to the top end portion of the gap concealing member, the gap concealing member extends downwards on progression towards the vehicle front, and the bottom end portion of the gap concealing member is disposed below the seat cushion. It accordingly becomes difficult to notice the coupling portion between the bottom end portion of the gap concealing member and the moving member from the vehicle rear.

According to the vehicle seat of the second aspect of the present invention, the aesthetics of the gap concealing member can accordingly be further enhanced.

A vehicle seat of a third aspect of the present invention is the first aspect of the present invention, wherein: the top end portion of the gap concealing member is rotatably coupled to the seat cushion and the bottom end portion of the gap concealing member is coupled to the moving member so as to be capable of relative movement with respect to the moving member; an engaging portion is provided at one location out of the bottom end portion of the gap concealing member or the moving member; and a sliding groove with which the engaging portion slidably engages is provided at the other location out of the bottom end portion of the gap concealing member or the moving member.

In the vehicle seat of the third aspect of the present invention, the top end portion of the gap concealing member is rotatably coupled to the seat cushion and the bottom end portion of the gap concealing member is coupled to the moving member so as to be capable of relative movement with respect to the moving member. The engaging portion provided at one location out of the bottom end portion of the gap concealing member or the moving member is slidably engaged with the sliding groove provided at the other location out of the bottom end portion of the gap concealing member or the moving member. A swinging (movement) path of the gap concealing member is accordingly provided by the sliding groove.

Therefore, according to the vehicle seat of the third aspect of the present invention, the swinging (movement) path of the gap concealing member can be set.

A vehicle seat of a fourth aspect of the present invention is the first aspect of the present invention wherein: the top end portion of the gap concealing member is coupled to the seat cushion so as to be capable of relative movement with respect to the seat cushion and the bottom end portion of the gap concealing member is rotatably coupled to the moving member; an engaging portion is provided at one location out of the top end portion of the gap concealing member or the seat cushion; and a sliding groove with which the engaging portion slidably engages is provided at the other location out of the top end portion of the gap concealing member or the seat cushion.

In a vehicle seat of the fourth aspect of the present invention, the top end portion of the gap concealing member is coupled to the seat cushion so as to be capable of relative movement with respect to the seat cushion and the bottom end portion of the gap concealing member is rotatably coupled to the moving member. The engaging portion, provided at one location out of the top end portion of the gap concealing member or the seat cushion, slidably engages with the sliding groove provided at the other location out of the top end portion of the gap concealing member or the seat cushion. Due to the sliding groove being formed to match the movement path of the seat cushion when the top-bottom direction position of the seat cushion is adjusted, the top-bottom direction movement of the seat cushion is permitted.

Therefore, according to the fourth aspect of the present invention, movement of the seat cushion can be permitted by the sliding groove.

A vehicle seat of a fifth aspect of the present invention is the second aspect of the present invention, wherein: the vehicle seat further comprises a coupling member that configures a part of the lifter mechanism, a first end portion of the coupling member being rotatably coupled to the moving member and a second end portion of the coupling member being rotatably coupled to the seat cushion, and the coupling member adjusting a position of the seat cushion in a top-bottom direction by a rotation thereof; and a distance from the top end portion to the bottom end portion of the gap concealing member is set shorter than a distance from the first end portion to the second end portion of the coupling member.

In a vehicle seat of the fifth aspect of the present invention, the first end portion of the coupling member of the lifter mechanism is rotatably coupled to the moving member and the second end portion of the coupling member is rotatably coupled to the seat cushion. The top-bottom direction position of the seat cushion is adjusted by rotating the coupling member.

The distance from the top end portion to the bottom end portion of the gap concealing member is set shorter than the distance from the first end portion to the second end portion of the coupling member. The angle of inclination of the gap concealing member with respect to the rail can accordingly be made large when the seat cushion is disposed in its uppermost position. The gap between the seat cushion and the rail can accordingly be effectively concealed when the seat cushion is disposed in its uppermost position.

Therefore, according to a vehicle seat of the fifth aspect of the present invention, the gap between the seat cushion and the rail can be effectively concealed.

A vehicle seat of a sixth aspect of the present invention is the second aspect of the present invention, wherein the top end portion of the gap concealing member is disposed towards the vehicle front with respect to a vehicle rear direction end portion of the seat cushion.

In a vehicle seat of the sixth aspect of the present invention, the top end portion of the gap concealing member is disposed towards the vehicle front with respect to the vehicle rear direction end portion of the seat cushion, and hence the gap concealing member extends downwards on progression towards the vehicle front at the vehicle front side of the vehicle rear direction end portion of the seat cushion. It is accordingly becomes difficult to notice the gap between the top end portion of the gap concealing member and the seat cushion due to the vehicle rear direction end portion of the seat cushion. The top-bottom direction position of the seat cushion can accordingly be adjusted without making the gap concealing member project out towards the vehicle rear from the vehicle seat.

Therefore, according to the vehicle seat of the sixth aspect of the present invention, the top-bottom direction position of the seat cushion can be adjusted without making the gap concealing member project out towards the vehicle rear from the vehicle seat.

A vehicle seat of a seventh aspect of the present invention is the third aspect of the present invention, wherein the sliding groove is disposed above the rail and extends along the vehicle front-rear direction.

In the vehicle seat of the seventh aspect of the present invention, the sliding groove is disposed above the rail and extends along the vehicle front-rear direction, and the gap concealing member can accordingly be made to swing above the rail.

Therefore, according to the vehicle seat of the seventh aspect of the present invention, the gap concealing member can be made to swing between the rail and the seat cushion.

A vehicle seat of an eighth aspect of the present invention is the seventh aspect of the present invention, wherein the seat cushion includes a support shaft that fits together with the top end portion of the gap concealing member and that rotatably supports the top end portion of the gap concealing member.

In a vehicle seat of the eighth aspect of the present invention, the seat cushion is equipped with the support shaft, and the top end portion of the gap concealing member fits together with the support shaft, such that the top end portion of the gap concealing member is rotatably supported by the support shaft. The gap concealing member can accordingly be coupled to the seat cushion using a simple configuration.

Therefore, according to a vehicle seat of the eighth aspect of the present invention, the ease of assembly can be raised during gap concealing member assembly.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
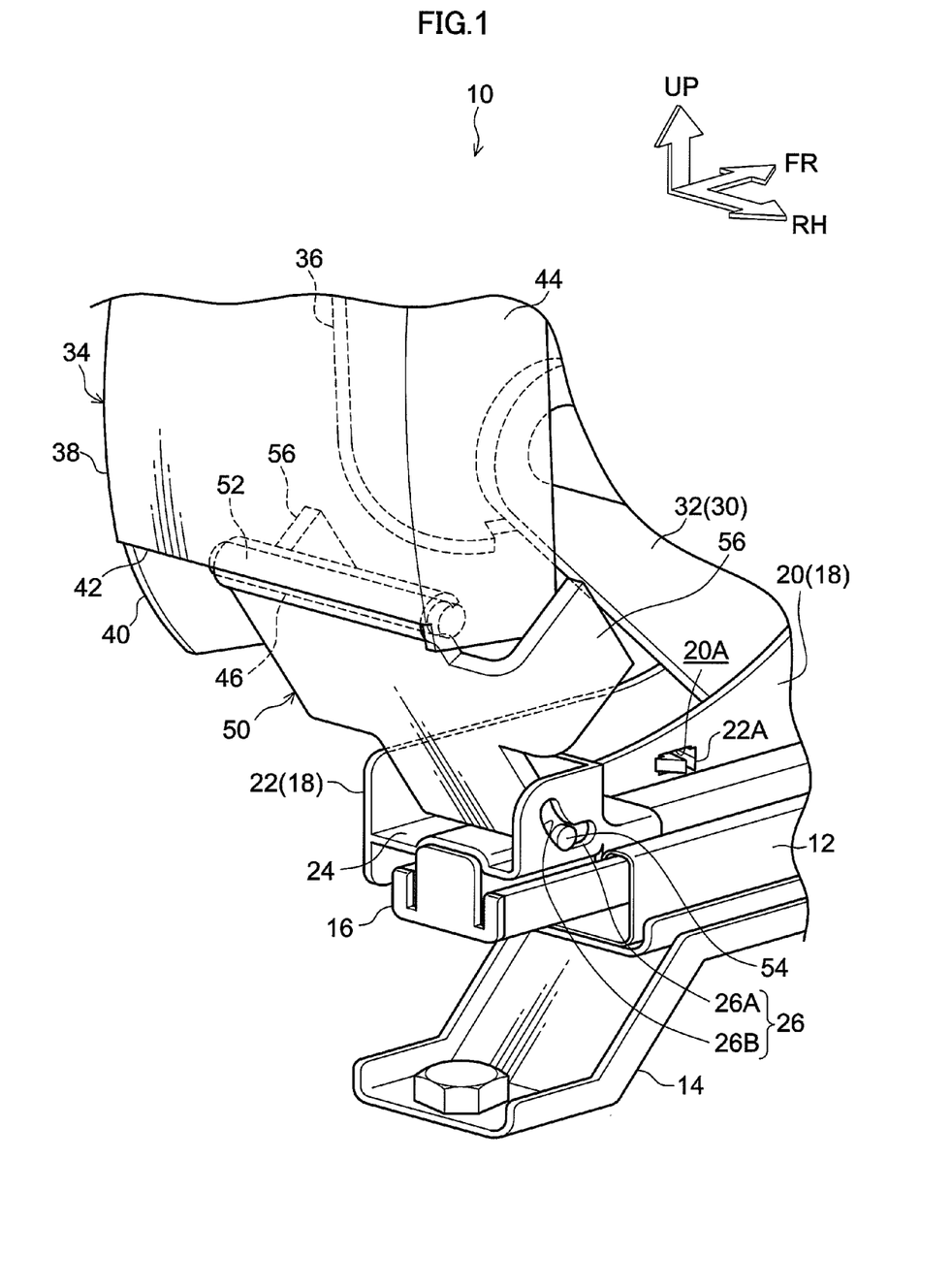
FIG. 1 is a perspective view of relevant portions of a front seat according to a first exemplary embodiment of the present invention, as viewed from the vehicle right diagonally from the rear.
Figure 2:
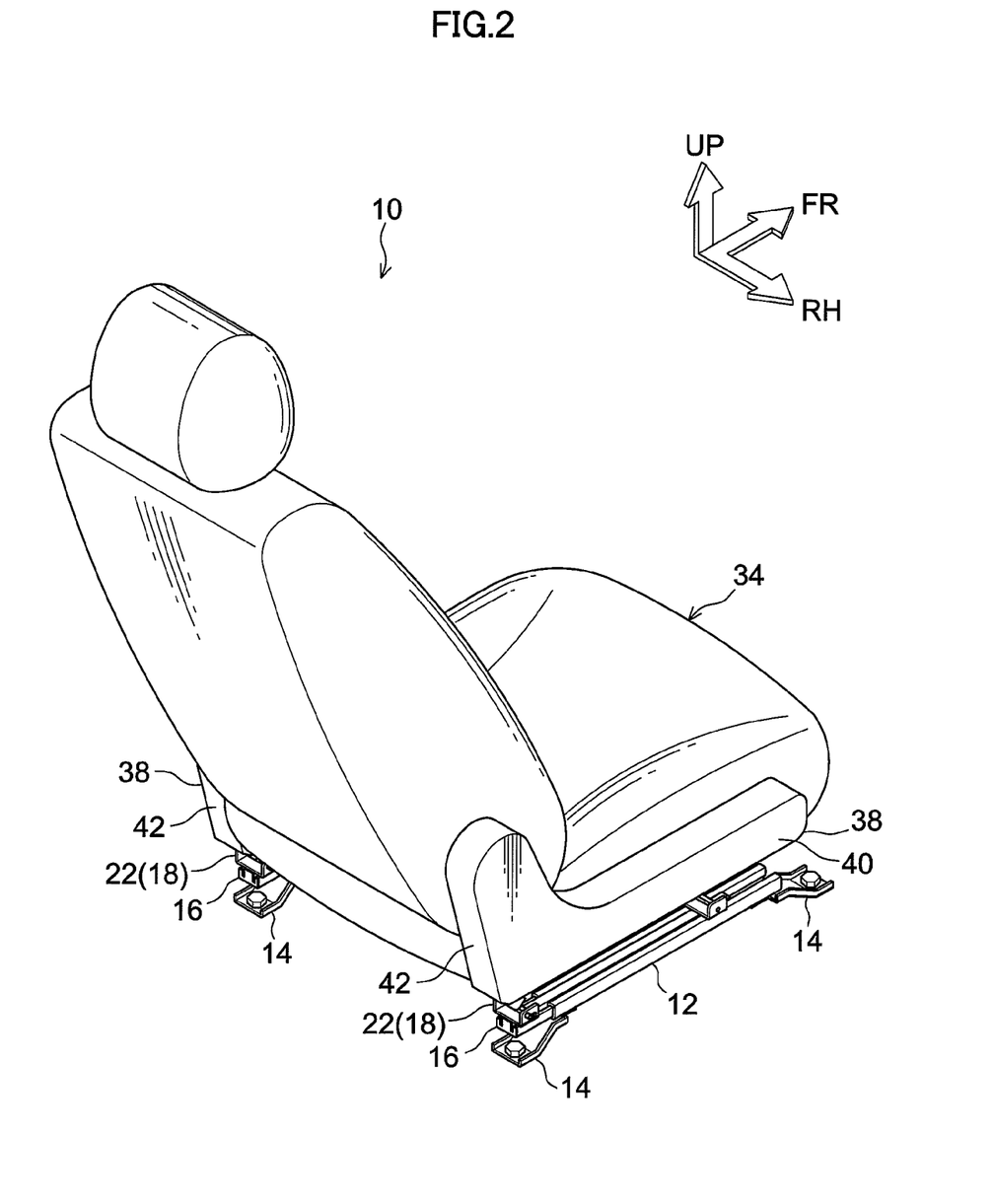
FIG. 2 is a perspective view of the front seat shown in FIG. 1, as viewed from the vehicle right diagonally from the rear.

FIG. 1 is a perspective view of a vehicle rear lower portion of a vehicle left side portion of a front seat 10 serving as a vehicle seat according to a first exemplary embodiment of the present invention, as viewed from the vehicle right diagonally from the rear. FIG. 2 is an overall perspective view of the front seat 10, as viewed from the vehicle right diagonally from the rear. In the drawings the arrow FR indicates the vehicle front, the arrow RH indicates the vehicle right (one vehicle width direction side) and the arrow UP indicates the top, as appropriate.

As shown in these figures, a pair of elongated shaped guide rails 12 are provided at a lower portion of the front seat 10. The guide rails 12 are disposed parallel to each other along the vehicle front-rear direction. The two length direction end portions of the guide rails 12 are fixed to a vehicle body floor of the vehicle through a pair of leg brackets 14. The guide rails 12 are formed with cross-sections that have substantially C-shaped profiles, opening upwards.

Upper rails 16 serving as rails are respectively provided inside the pair of guide rails 12. The upper rails 16 are formed in elongated shapes and are configured so as to be capable of sliding movement in the vehicle front-rear direction with respect to the guide rails 12.

As shown in FIG. 1, riser units 18 serving as moving members are respectively provided above the upper rails 16. Each of the riser units 18 includes a riser 20 and a lower finisher 22. The risers 20 are manufactured from sheet metal, and lower portions of the risers 20 are fixed to the upper rails 16. The risers 20 are accordingly configured so as to be capable of moving in the vehicle front-rear direction as one with the upper rails 16. Plural engagement holes 20A for attaching the lower finishers 22, described later, to are provided in the risers 20 (only one of the engagement holes 20A is shown in FIG. 1). The engagement holes 20A are formed with substantially rectangular shapes.

The lower finishers 22 are provided at the vehicle width direction outsides of the risers 20 (at the vehicle left in FIG. 1). The lower finishers 22 are formed from a resin substantially in a plate shape, and extend along the vehicle front-rear direction to cover the vehicle width direction outside portions of the risers 20. Plural engagement claws 22A are provided at the lower finishers 22 (only one of the engagement claws 22A is shown in FIG. 1). The engagement claws 22A are disposed at positions corresponding to the engagement holes 20A of the risers 20. The engagement claws 22A engage with the engagement holes 20A, and the lower finishers 22 are thereby assembled to the risers 20. The lower finishers 22 are accordingly configured so as to be capable of moving in the vehicle front-rear direction as one with the upper rails 16.

Housing portions 24 for housing the bottom end portion of shields 50, described later, are provided above the upper rails 16 at the vehicle rear direction end portions of the lower finishers 22. The housing portions 24 are formed in substantially rectangular box shapes open to the top and to the vehicle rear. The bottom walls of the housing portions 24 are fixed in a state of contact to the top face of the upper rails 16.

Guide grooves 26 serving as sliding grooves are provided piercing through the side walls at the two vehicle width direction sides of each of the housing portions 24 in the vehicle width direction. The guide grooves 26 respectively include straight line groove portions 26A provided to extend along the vehicle front-rear direction, and inclined groove portions 26B extending from the vehicle rear direction end of the straight line groove portions 26A. The inclined groove portions 26B slope upwards on progression towards the vehicle rear and curve around such that the vehicle rear direction side has a protruding shape. The guide grooves 26 extend along the vehicle front-rear direction overall.

First ends of links 32 serving as coupling members manufactured from sheet metal are rotatably coupled to the vehicle front direction portions and the vehicle rear direction portions of the risers 20 (only one of the links 32 disposed at the vehicle rear is illustrated in FIG. 1). The links 32 configure part of a lifter mechanism 30. The lifter mechanism 30 is provided for adjusting the top-bottom direction position of a seat cushion 34, described later. The links 32 are disposed so as to slope upwards on progression towards the vehicle rear. The lifter mechanism 30 is configured so as to be operated by an occupant manipulating an operating lever, not shown in the drawings, disposed at the side of the front seat 10.

The seat cushion 34 for seating the occupant is provided above the upper rails 16 (the guide rails 12) (see FIG. 2). A cushion frame (not shown in the drawings) serving as framework for the seat cushion 34 is provided inside the seat cushion 34. The cushion frame includes a pair of side frames 36 at the two vehicle width direction side portions. Second end portions of the links 32 of the lifter mechanism 30 are rotationally coupled to the side frames 36. The seat cushion 34 is thereby coupled to the risers 20 (to the riser units 18) through the lifter mechanism 30. When the lifter mechanism 30 is actuated, due to the links 32 rotating about pivot points of the second end portions of the links 32, the seat cushion 34 pivots towards a first pivoting direction side (the arrow A direction in FIG. 3) or pivots towards a second pivoting direction side (the arrow B direction in FIG. 4). A configuration is accordingly achieved in which the top-bottom direction position of the seat cushion 34 can be adjusted.

As shown in FIG. 1 and FIG. 2, a pair of outer finishers 38 manufactured from a resin are provided at the two vehicle width direction sides of the seat cushion 34 (for convenience the lower portion of the outer finisher 38 is omitted from FIG. 2). The outer finishers 38 are disposed at the vehicle width direction outsides (the vehicle left in FIG. 1) of the side frames 36, and assembled to the side frames 36. The outer finishers 38 include main body portions 40. The main body portions 40 extend along the vehicle front-rear direction at the vehicle width direction outsides of the side frames 36, covering the side frames 36. Rear side walls 42 are provided at vehicle rear direction end portions of the outer finishers 38. The rear side walls 42 extend from vehicle rear direction end portions of the main body portions 40 towards the inside (the vehicle right direction in FIG. 1). Side walls 44 are provided at vehicle rear direction portions of the outer finishers 38. The side walls 44 extend towards the vehicle front from inside end portions of the rear side walls 42 and are disposed facing towards the main body portions 40.

As shown in FIG. 1, support rods 46 serving as support shafts for supporting the shields 50, described later, are provided at vehicle rear direction portions of the outer finishers 38. The support rods 46 are formed in shaft shapes with circular cross-sections, disposed along the vehicle width direction so as to span between the main body portions 40 and the side walls 44. The support rods 46 are disposed above and to the vehicle rear of the guide grooves 26 described above.

The shields 50 serving as gap concealing members are provided between the housing portions 24 of the lower finishers 22 and the support rods 46 of the outer finishers 38. The shields 50 are manufactured from a resin and are formed with substantially plate shaped profiles. Support portions 52 are provided at the top end portions of the shields 50. The support portions 52 are formed in circular ring shapes, as viewed from the side, with opening portions towards the vehicle front. The support rods 46 fit together with (are fitted into) the support portions 52 through the opening portions of the support portions 52. The support portions 52 are rotatably supported by (coupled to) the support rods 46. The support portions 52 are disposed towards the vehicle front with respect to the rear side walls 42 of the outer finishers 38 (with respect to a vehicle rear direction end portion of the seat cushion 34), such that a slight gap is provided between the outer peripheral portion of the support portions 52 and the bottom end portion of the rear side walls 42.

The shields 50 are integrally formed across from the top end portions to the bottom end portions thereof, with a pair of engaging pins 54 serving as engaging portions integrally provided at portions at the two width direction sides of bottom end portions of the shields 50. The engaging pins 54 are formed in circular columnar shapes that project out from the shields 50 in the vehicle width direction in directions separating from each other. The bottom end portions of the shields 50 are housed inside the housing portions 24 of the lower finishers 22, and the pair of engaging pins 54 are respectively engaged inside the guide grooves 26 of the lower finishers 22 so as to be capable of sliding. The shields 50 are accordingly disposed sloping downwards on progression towards the vehicle front, as viewed from the side, with the bottom end portions of the shields 50 coupled to the lower finishers 22 so as to be capable of relative movement with respect to the lower finishers 22. The shields 50 are accordingly configured so as to be capable of swinging by the engaging pins 54 sliding inside the guide grooves 26 when the top end portions of the shields 50 move. Moreover, the distance from the axial center of the support portions 52 of the shields 50 to the axial center of the engaging pins 54 is set shorter than the length from first end portions of the links 32 of the lifter mechanism 30 (the coupling portion to the risers 20) to second end portions of the links 32 (the coupling portion to the side frames 36).

A pair of shield side walls 56 are integrally provided at portions at the two width direction sides of each of the shields 50. The shield side walls 56 extend out from the shields 50 and are disposed in a direction orthogonal to the vehicle width direction. The pair of shield side walls 56 are disposed between the main body portions 40 and the side walls 44 of the outer finishers 38, and are disposed so as to conceal spaces below the main body portions 40 and the side walls 44.

Explanation follows regarding operation and advantageous effects of the first exemplary embodiment.

In the front seat 10 the shields 50 are provided between the upper rails 16 and the seat cushion 34. The support portions 52 of the shields 50 are rotatably fitted together with the support rods 46 of the outer finishers 38, and the engaging pins 54 of the shields 50 are engaged inside the guide grooves 26 of the lower finishers 22. The gaps between the upper rails 16 and the seat cushion 34 are accordingly concealed by the shields 50. The gaps between the seat cushion 34 and the upper rails 16 are accordingly suppressed from being noticed, and the feet of an occupant seated in a vehicle rear seat are prevented from being trapped between the seat cushion 34 and the upper rails 16.

Figure 3:
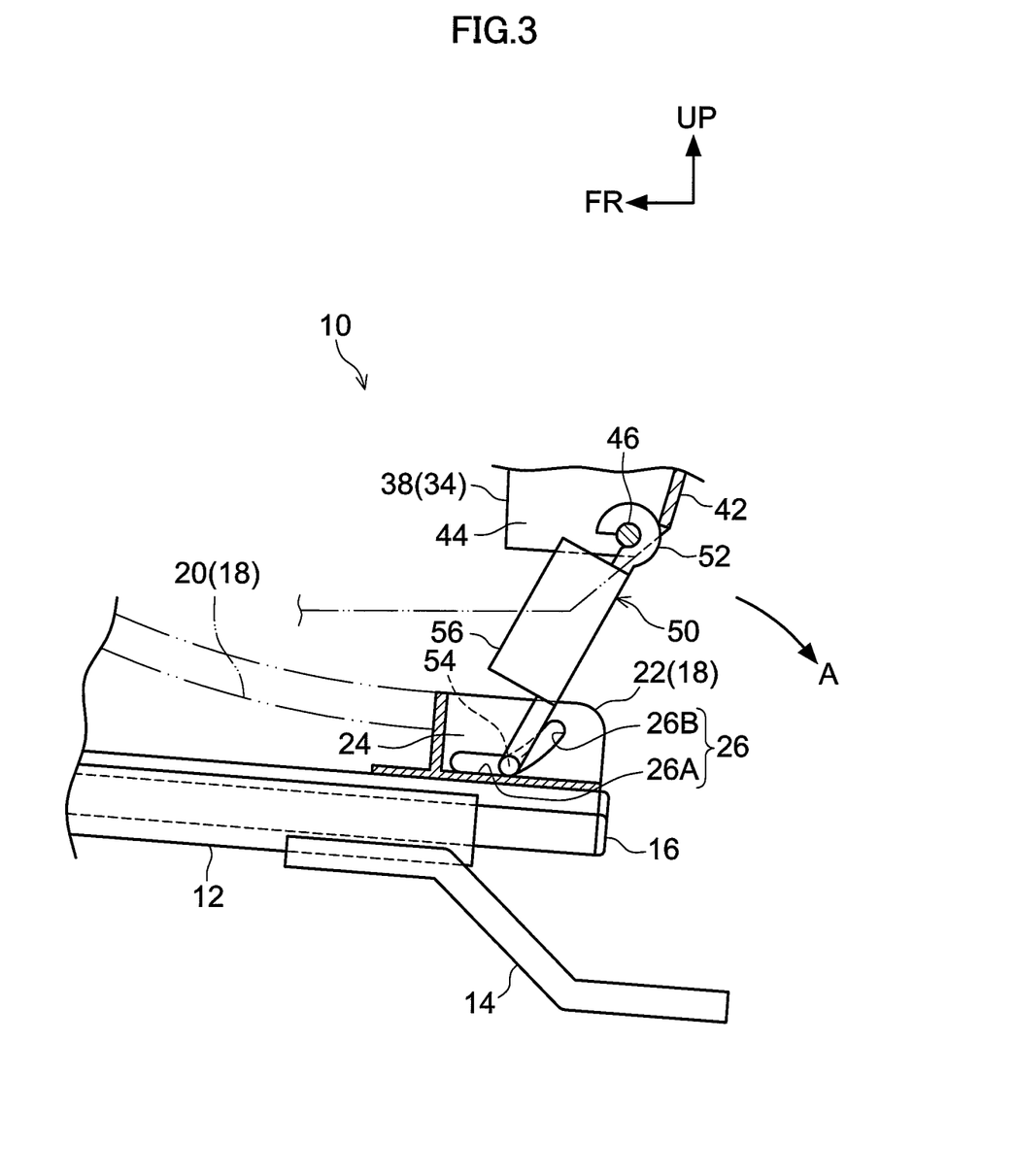
FIG. 3 is a partially cut-away side view of a state in which a seat cushion employed in the front seat shown in FIG. 2 is disposed at its uppermost position, as viewed from the vehicle left side.

The seat cushion 34 is coupled to the risers 20 through the lifter mechanism 30, and the top-bottom direction position of the seat cushion 34 is adjusted by the lifter mechanism 30. As shown in FIG. 3, when the seat cushion 34 is disposed in its uppermost position, the engaging pins 54 of the shields 50 are disposed at the boundary portions between the straight line groove portions 26A and the inclined groove portions 26B of the guide grooves 26, and the shields 50 are disposed sloping downwards on progression towards the vehicle front. The bottom end portions of the shields 50 are accordingly disposed below the seat cushion 34.

In order to lower the position of the seat cushion 34 from this state, the occupant manipulates an operation lever provided at the side of the front seat 10. The links 32 are accordingly pivoted about pivot points of the first end portions of the links 32 by actuating the lifter mechanism 30, and the seat cushion 34 pivots towards a first pivoting direction side (the arrow A direction in FIG. 3). The support rods 46 of the outer finishers 38 therefore pivot towards the first pivoting direction side.

The support portions 52 of the shields 50 are rotatably fitted together with (coupled to) the support rods 46 of the seat cushion 34, and the engaging pins 54 of the shields 50 are engaged with (coupled to) the guide grooves 26 of the lower finishers 22 so as to be capable of relative movement with respect to the lower finishers 22.

Hence when the support rods 46 pivot towards the first pivoting direction side, the support portions 52 of the shields 50 pivot towards the first pivoting direction side together with the support rods 46 as the support portions 52 gradually pivot about the axial line of the support rods 46.

When the support portions 52 pivot towards the first pivoting direction side, the engaging pins 54 of the shields 50 move in the guide grooves 26 towards the vehicle front (relatively move with respect to the lower finishers 22). Swinging (movement) of the shields 50 to follow pivoting (movement)

of the seat cushion 34 is accordingly permitted. The shields 50 accordingly swing so as to tilt downwards.

However, the shields 50 are integrally formed form the top end portions (the support portions 52) to the bottom end portions, and so the shields 50 do not bend between the top end portion and the bottom end portion when the shields 50 swing accompanying pivoting of the seat cushion 34. Hence, the aesthetics of the shields 50 can be enhanced in comparison to hypothetical cases in which the shields 50 were configured so as to be bendable, with bent portions of the shields 50 being noticeable when the shields 50 swings.

The bottom end portions of the shields 50 (the engaging pins 54) are also disposed towards the vehicle front with respect to the top end portions (the support portions 52) of the shields 50, and so the shields 50 extend downwards on progression towards the vehicle front, and the engaging pins 54 of the shields 50 are disposed below the seat cushion 34. The engaging pins 54 of the shields 50 and the guide grooves 26 of the lower finishers 22 can hence be suppressed from being noticed from the vehicle rear direction. The aesthetics of the shields 50 can accordingly be enhanced even further.

The engaging pins 54 of the shields 50 are slidably engaged with the guide grooves 26 of the lower finishers 22 in the manner described above, and the support portions 52 of the shields 50 are supported by the support rods 46 of the outer finishers 38. The movement path when the shields 50 swing (move) can accordingly be set by the guide grooves 26.

The distance (length) from the axial center of the support portions 52 of the shields 50 to the axial center of the engaging pins 54 is set shorter than the distance (length) from first end portions of the links 32 (the coupling portions to the risers 20) to the second end portions (the coupling portions to the side frames 36) of the lifter mechanism 30. A large angle of inclination can accordingly be set for the shields 50 with respect to the upper rails 16 when the seat cushion 34 is disposed in its uppermost position. Namely, when the seat cushion 34 is disposed in its uppermost position, due to being able to dispose the shields 50 so as to approach the perpendicular direction to the upper rails 16, the gaps between the seat cushion 34 and the upper rails 16 can be effectively concealed when the seat cushion 34 is disposed in its uppermost position.

Figure 4:
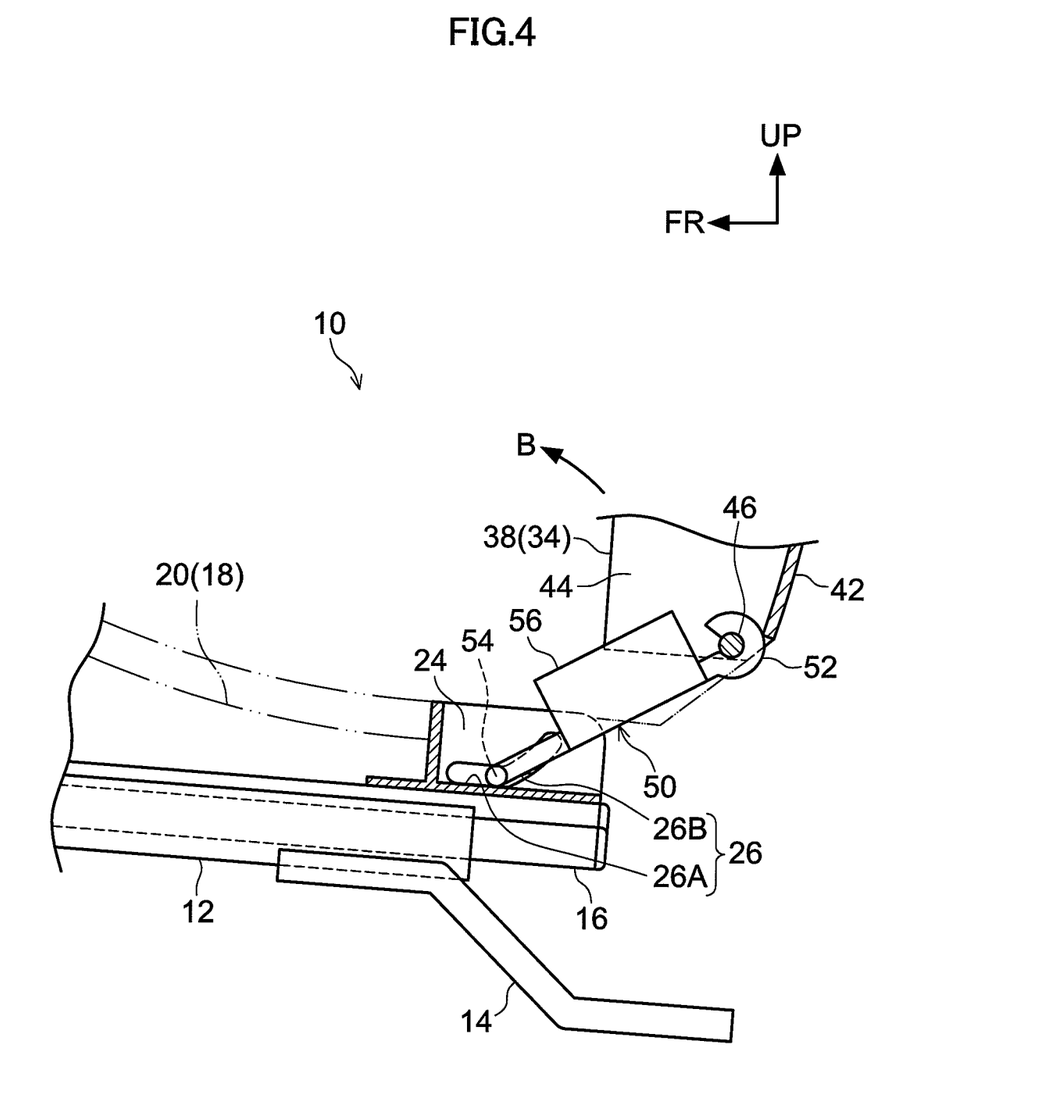
FIG. 4 is a partially cut-away side view of a state in which a seat cushion employed in the front seat shown in FIG. 2 is disposed at its lowermost position, as viewed from the vehicle left side.

The guide grooves 26 are also disposed above the upper rails 16 extending along the vehicle front-rear direction. The shields 50 can accordingly be caused to swing between the upper rails 16 and the seat cushion 34. In particular, as shown in FIG. 4, when the outer finishers 38 (the seat cushion 34) are disposed at their lowermost position, the engaging pins 54 of the shields 50 are disposed inside the straight line groove portions 26A of the guide grooves 26, and the shields 50 are housed in an inclined state between the outer finishers 38 (the seat cushion 34) and the guide rails 12. The shields 50 can thereby be entirely housed in the confined space between the seat cushion 34 and the upper rails 16.

The support portions 52 of the shields 50 are disposed towards the vehicle front with respect to the rear side walls 42 of the outer finishers 38 (the vehicle rear direction end portions of the seat cushion 34). The shields 50 can accordingly be provided at the vehicle front of the rear side walls 42 and extending downwards on progression towards the vehicle front direction. It accordingly becomes difficult for the gaps between the support portions 52 of the shields 50 and the rear side walls 42 to be noticed due to the presence of the rear side walls 42 (the vehicle rear end portions of the seat cushion 34). The engaging pins 54 of the shields 50 are configured to be capable of relative movement with respect to the guide grooves 26 in the vehicle front-rear direction, and so the shields 50 can be caused to swing without projecting out from the front seat 10 to the vehicle rear direction when the shields 50 swing.

The support rods 46 are provided at the outer finishers 38, and the support portions 52 of the shields 50 are rotatably supported by the support rods 46 by the support rods 46 being inserted into (fitting together with) the support portions 52 of the shields 50 through the opening portions of the support portions 52. The shields 50 can accordingly be coupled to the seat cushion 34 with a simple configuration. The ease of assembly when assembling the shields 50 can accordingly be raised.

The guide grooves 26 are provided at the lower finishers 22, and the support rods 46 are provided at the outer finishers 38. The shields 50 can accordingly be provided at the front seat 10 by utilizing existing components.

Note that in the first exemplary embodiment, when the seat cushion 34 is disposed in its uppermost position, the engaging pins 54 of the shields 50 are disposed at the boundary portions between the straight line groove portions 26A and the inclined groove portions 26B of the guide grooves 26, and when the seat cushion 34 is disposed in its lowermost position, the engaging pins 54 are disposed in the straight line groove portions 26A of the guide grooves 26. Alternatively, the engaging pins 54 may be set such that such that when the seat cushion 34 is disposed in its uppermost position, the engaging pins 54 are disposed in the inclined groove portions 26B of the guide grooves 26, and when the seat cushion 34 is disposed in its lowermost position the engaging pins 54 are disposed in the straight line groove portions 26A of the guide grooves 26. In such cases, for example, the engaging pins 54 may be disposed further towards the top end side of the shields 50. Adopting such an approach lowers the force of press contact of the engaging pins 54 with the inner peripheral portion of the guide grooves 26 when the seat cushion 34 moves downwards from the state in which the seat cushion 34 is disposed in its uppermost position. The shields 50 can accordingly be caused to swing smoothly.

In the first exemplary embodiment, the guide grooves 26 are configured including the straight line groove portions 26A and the inclined groove portions 26B, however the guide grooves 26 may be configured with the straight line groove portions 26A alone. In such cases the guide grooves 26 may be disposed so as to slope slightly upwards on progression towards the vehicle rear direction.

In the first exemplary embodiment, the guide grooves 26 are provided at the lower finishers 22, however the member in which the guide grooves 26 are provided is not limited thereto. For example, a separate bracket may be fixed to the upper rails 16. The guide grooves 26 are then formed in this bracket that serves as the moving member of the present invention. Namely, the guide grooves 26 may be provided at any member that moves as one with the upper rails 16. In such cases the seat cushion 34 is indirectly coupled to this bracket through the lifter mechanism 30.

In the first exemplary embodiment, the support portions 52 of the shields 50 are rotatably supported by the outer finishers 38, however the member for supporting the support portions 52 is not limited thereto. For example, the support portions 52 may be rotatably supported by the side frames 36. Namely, the support portions 52 of the shields 50 may be supported by any member that pivots as one with the seat cushion 34.

Second Exemplary Embodiment

Figure 5:
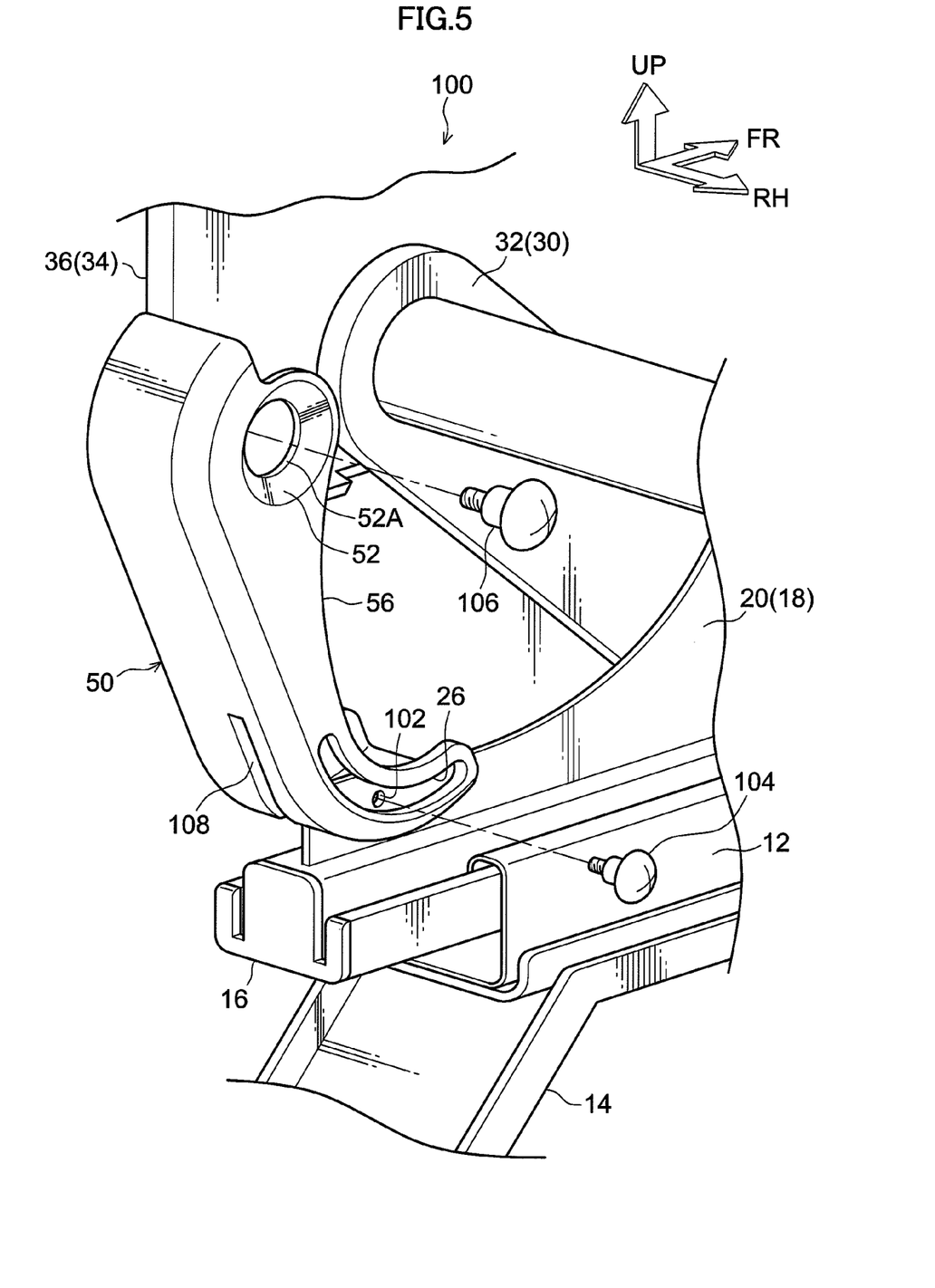
FIG. 5 is a perspective view of relevant portions of a front seat according to a second exemplary embodiment of the present invention, as viewed from the vehicle right diagonally from the rear.

In a front seat 100 according to a second exemplary embodiment, configuration is substantially the same as that of the front seat 10 according to the first exemplary embodiment, however it differs in the following points.

The front seat 100 is not equipped with the support rods 46 of the first exemplary embodiment or with the housing portions 24 of the lower finishers 22 of the first exemplary embodiment.

As shown in FIG. 5, thread portions 102 are formed in a vehicle rear direction end portions of risers 20. First stepped screws 104 serving as engaging portions are screwed into the thread portion 102. Note that outer finishers 38 and lower finishers 22 are omitted from illustration in FIG. 5.

Shields 50 are also formed curved so as to form a shape protruding towards the vehicle rear side as viewed from the side, and formed with a substantially U-shaped cross-section profile. Support portions 52 are provided at upper portions of a shield side wall 56 on the vehicle right side of the shields 50. The support portions 52 are formed in indented shapes, with through holes 52A formed through a central portion of the support portions 52. Second stepped screws 106 serving as support shafts are inserted into the through holes 52A, and the second stepped screws 106 are screwed into the side frames 36 of the seat cushion 34. The shields 50 are thereby rotatably supported by side frames 36.

Figure 6:
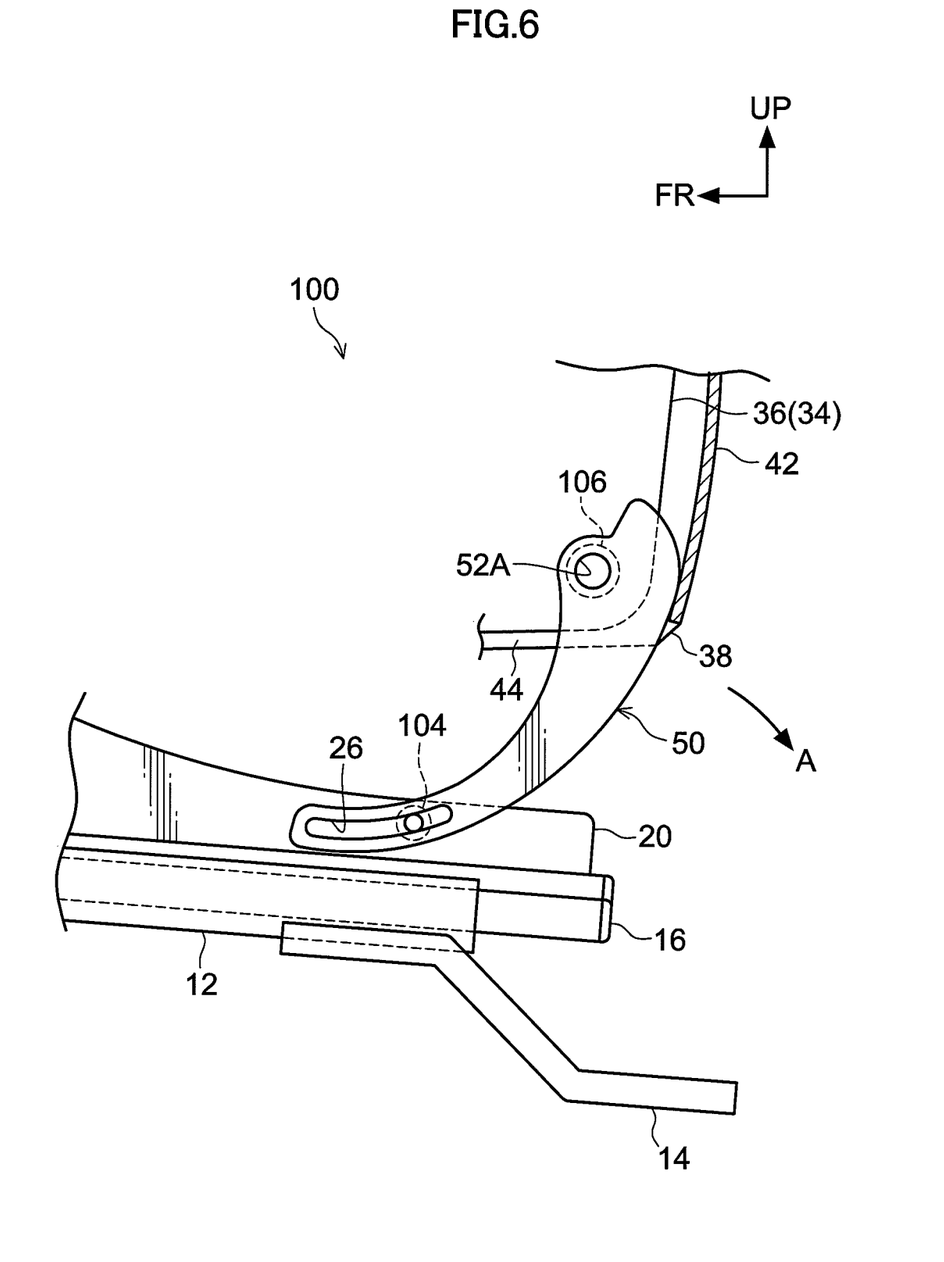
FIG. 6 is a partially cut-away side view of a state in which a seat cushion employed in the front seat shown in FIG. 5 is disposed at its uppermost position, as viewed from the vehicle left side.
Figure 7:
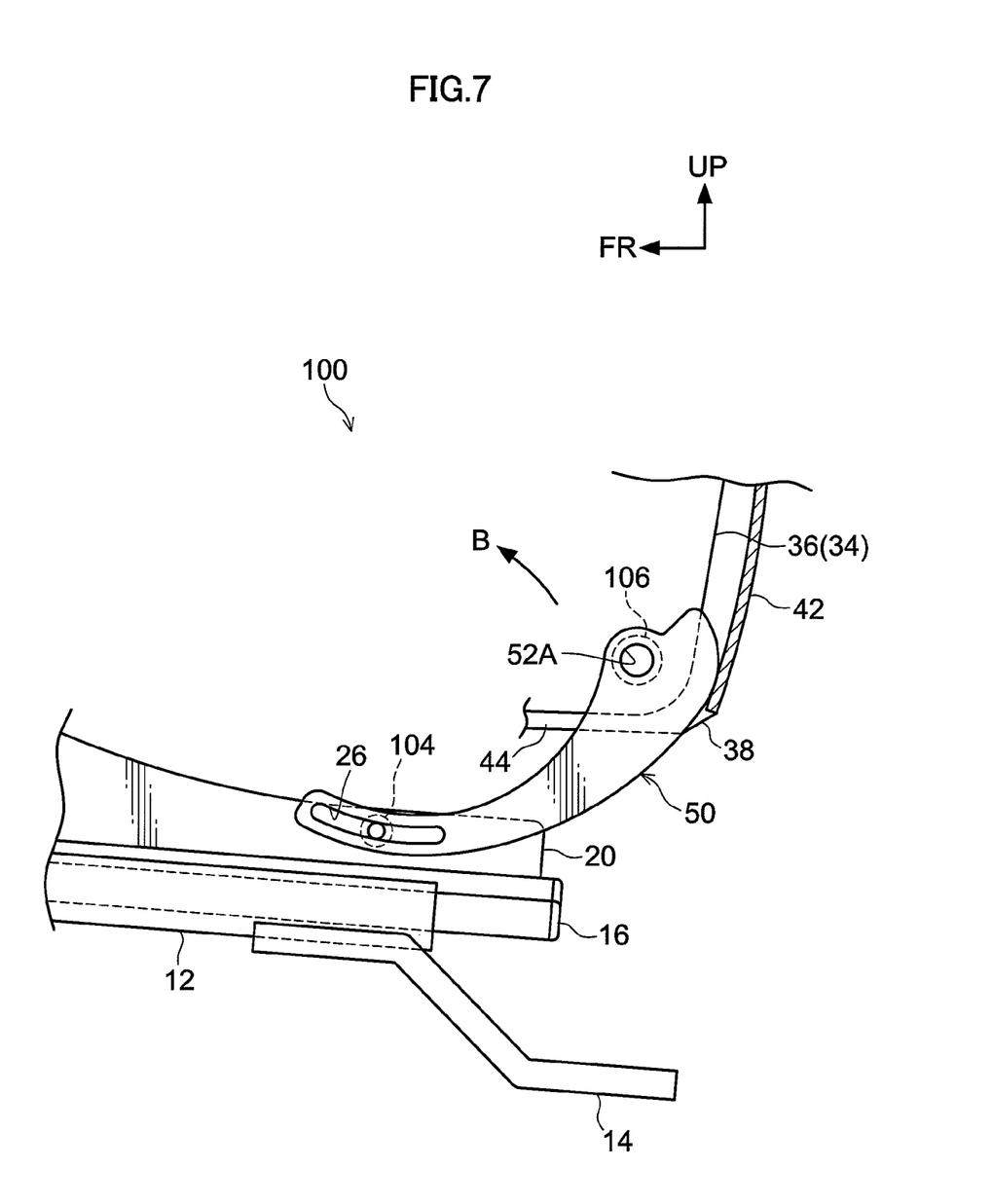
FIG. 7 is a partially cut-away side view of a state in which a seat cushion employed in the front seat shown in FIG. 5 is disposed at its lowermost position, as viewed from the vehicle left side.

As shown in FIG. 6 and FIG. 7, the top end portion of the shields 50 are disposed at the vehicle front direction side of rear side walls 42 of the outer finishers 38, with a slight gap set between the shields 50 and the outer finishers 38. Note that for ease of explanation, the shield 50 and the riser 20 shown in FIG. 6 and FIG. 7 are those disposed with the opposite positional relationships in the vehicle width direction.

As shown in FIG. 5, slits 108 are provided in lower portions of the shields 50. The slits 108 are formed along the length direction of the shields 50, and are open towards the bottom end of the shields 50. The width dimension of the slits 108 is set to be slightly larger than the plate thickness dimension of the risers 20, and the risers 20 are disposed inside the slits 108.

Guide grooves 26 serving as sliding grooves are provided in bottom end portions of the shield side walls 56 at the vehicle right side of the shields 50. The guide grooves 26 are formed curving along the curve direction of the shields 50. The guide grooves 26 thereby extend overall along the vehicle front-rear direction. The first stepped screws 104 are inserted through inside the guide grooves 26, in a configuration in which the guide grooves 26 are capable of sliding with respect to the first stepped screws 104. In other words, the first stepped screws 104 are configured so as to be capable of sliding with respect to the guide grooves 26. The bottom end portions of the shields 50 are thereby configured capable of relative movement with respect to the risers 20.

As shown in FIG. 6, when the seat cushion 34 is disposed in its uppermost position, the first stepped screws 104 are disposed at the vehicle rear portion of the guide grooves 26, and the shields 50 are disposed inclined with respect to the upper rails 16. When the seat cushion 34 is pivoted from this state towards the first pivoting direction side (in the arrow A direction in FIG. 6), the shields 50 rotate about the axial line of the second stepped screws 106 and pivot together with the second stepped screws 106 towards the first pivoting direction side.

When the second stepped screws 106 pivot further to the first pivoting direction side, the guide grooves 26 of the shields 50 move towards the vehicle front with respect to the first stepped screws 104 (relatively move with respect to the risers 20). Swinging (movement) of the shields 50 is accordingly permitted to follow the pivoting (movement) of the seat cushion 34. The shields 50 accordingly swing so as to be inclined downwards. Then, as shown in FIG. 7, when the outer finishers 38 (the seat cushion 34) are disposed in their lowermost position, the shields 50 are housed in an inclined state between the outer finishers 38 (the seat cushion 34) and the upper rails 16.

The second exemplary embodiment exhibits similar operation and advantageous effects to the first exemplary embodiment, except for the feature of the support portions 52 of the shields 50 fitting together with the support rods 46 in the first exemplary embodiment.

In the second exemplary embodiment, the first stepped screws 104 are screwed into the risers 20, however the member into which the first stepped screws 104 are screwed is not limited thereto. For example, separate brackets may be provided fixed to the upper rails 16, and configuration may be made such that the first stepped screws 104 are screwed into these brackets that each serve as the moving member of the present invention. Namely, the first stepped screws 104 may be provided in any member that moves as one with the upper rails 16. In such cases the seat cushion 34 is indirectly coupled to the brackets through the lifter mechanism 30.

In the second exemplary embodiment, the support portions 52 of the shields 50 are also rotatably supported by the side frames 36, however the member rotatably supporting the support portions 52 is not limited thereto. For example, the support portions 52 may be rotatably supported by the outer finishers 38. In other words, the support portions 52 of the shields 50 may be supported by any member that pivots as one with the seat cushion 34.

Moreover, in the first exemplary embodiment and the second exemplary embodiment, the top end portions (the support portions 52) of the shields 50 are rotatably coupled to the seat cushion 34, and the bottom end portions of the shields 50 are coupled to the riser units 18 so as to be capable of relative movement with respect to the riser units 18 (the risers 20, the lower finishers 22). Alternatively, configuration may be made such that the top end portions of the shields 50 are coupled so as to be capable of relative movement with respect to the seat cushion 34, and the bottom end portions of the shields 50 are coupled so as to be capable of rotating with respect to the riser units 18 (the risers 20 and the lower finishers 22).

In an example of such a case, as applied to the first exemplary embodiment, the engaging pins 54 of the shields 50 are rotationally coupled to the lower finishers 22. The support rods 46 are omitted, bottomed profile guide grooves 26 are provided in the respective facing faces of the main body portions 40 and the side walls 44 of the outer finishers 38, and new engaging pins (engaging portions of the present invention) that slide inside the guide grooves 26 are provided at the top end portions of the shields 50. The guide grooves 26 may be formed to match the movement (pivoting) path of the seat cushion 34 when the top-bottom direction position of the seat cushion 34 is being adjusted, configuring such that the top end portion of the shields 50 at the vehicle front direction of the rear side walls 42 are capable of relative movement with respect to the seat cushion 34.

In an example of such a case, as applied to the second exemplary embodiment, the support portions 52 are provided at the bottom end portions of the shields 50, and the support portions 52 are rotatably coupled by the second stepped screws 106 to the risers 20. The guide grooves 26 are provided at the top end portions of the shields 50, and the first stepped screws 104 are slidably inserted through inside the guide grooves 26, and the first stepped screws 104 screwed into the side frames 36. Configuration may be made with the guide grooves 26 formed to match the movement (pivoting) path of the seat cushion 34 when the top-bottom direction position of the seat cushion 34 is being adjusted, such that the top end portions of the shields 50 at the vehicle front direction side of the rear side walls 42 are capable of relative movement with respect to the seat cushion 34.

Consequently, pivoting of the seat cushion 34 is permitted by relative movement of the seat cushion 34 with respect to the top end portions of the shields 50 when the top-bottom direction position of the seat cushion 34 is being adjusted. Hence, since in such cases too, the shields 50 are not bent between the top end portions and the bottom end portions, the aesthetics of the shields 50 can be enhanced.

What is claimed is:

1. A vehicle seat comprising:
    a moving member that moves as one with a rail configured to move in a vehicle front-rear direction;
    a seat cushion that is coupled to the moving member through a lifter mechanism, is disposed above the rail, and is configured such that the top-bottom direction position of the seat cushion is capable of being adjusted by the lifter mechanism; and
    a gap concealing member that extends between a vehicle rear direction lower portion of the seat cushion and the rail to conceal a gap between the seat cushion and the rail,
    a top end portion of the gap concealing member being rotatably coupled to the seat cushion and a bottom end portion of the gap concealing member being coupled to the moving member so as to be capable of relative movement with respect to the moving member or
    a top end portion of the gap concealing member being coupled to the seat cushion so as to capable of relative movement with respect to the seat cushion and a bottom end portion of the gap concealing member being rotatably coupled to the moving member, and
    the gap concealing member being integrally formed from the top end portion to the bottom end portion,
    wherein:
    the top end portion of the gap concealing member is rotatably coupled to the seat cushion and the bottom end portion of the gap concealing member is coupled to the moving member so as to be capable of relative movement with respect to the moving member;
    an engaging portion is provided at one location out of the bottom end portion of the gap concealing member or the moving member; and
    a sliding groove with which the engaging portion slidably engages is provided at the other location out of the bottom end portion of the gap concealing member or the moving member.

2. The vehicle seat of claim 1 wherein the bottom end portion of the gap concealing member is disposed towards a vehicle front with respect to the top end portion of the gap concealing member.

3. The vehicle seat of claim 2 wherein:
    the vehicle seat further comprises a coupling member that configures a part of the lifter mechanism, a first end portion of the coupling member being rotatably coupled to the moving member and a second end portion of the coupling member being rotatably coupled to the seat cushion, and the coupling member adjusting a position of the seat cushion in a top-bottom direction by a rotation thereof; and
    a distance from the top end portion to the bottom end portion of the gap concealing member is set shorter than a distance from the first end portion to the second end portion of the coupling member.

4. The vehicle seat of claim 2 wherein the top end portion of the gap concealing member is disposed towards the vehicle front with respect to a vehicle rear direction end portion of the seat cushion.

5. The vehicle seat of claim 1 wherein the sliding groove is disposed above the rail and extends along the vehicle front-rear direction.

6. The vehicle seat of claim 5 wherein the seat cushion comprises a support shaft that fits together with the top end portion of the gap concealing member and that rotatably supports the top end portion of the gap concealing member.

7. A vehicle seat comprising:
    a moving member that moves as one with a rail configured to move in a vehicle front-rear direction;
    a seat cushion that is coupled to the moving member through a lifter mechanism, is disposed above the rail, and is configured such that the top-bottom direction position of the seat cushion is capable of being adjusted by the lifter mechanism; and
    a gap concealing member that extends between a vehicle rear direction lower portion of the seat cushion and the rail to conceal a gap between the seat cushion and the rail,
    a top end portion of the gap concealing member being rotatably coupled to the seat cushion and a bottom end portion of the gap concealing member being coupled to the moving member so as to be capable of relative movement with respect to the moving member or
    a top end portion of the gap concealing member being coupled to the seat cushion so as to capable of relative movement with respect to the seat cushion and a bottom end portion of the gap concealing member being rotatably coupled to the moving member, and
    the gap concealing member being integrally formed from the top end portion to the bottom end portion,
    wherein:
    the top end portion of the gap concealing member is coupled to the seat cushion so as to be capable of relative movement with respect to the seat cushion and the bottom end portion of the gap concealing member is rotatably coupled to the moving member;
    an engaging portion is provided at one location out of the top end portion of the gap concealing member or the seat cushion; and
    a sliding groove with which the engaging portion slidably engages is provided at the other location out of the top end portion of the gap concealing member or the seat cushion.

8. The vehicle seat of claim 7 wherein the bottom end portion of the gap concealing member is disposed towards a vehicle front with respect to the top end portion of the gap concealing member.

9. The vehicle seat of claim 8 wherein:
    the vehicle seat further comprises a coupling member that configures a part of the lifter mechanism, a first end portion of the coupling member being rotatably coupled to the moving member and a second end portion of the coupling member being rotatably coupled to the seat cushion, and the coupling member adjusting a position of the seat cushion in a top-bottom direction by a rotation thereof; and
    a distance from the top end portion to the bottom end portion of the gap concealing member is set shorter than a distance from the first end portion to the second end portion of the coupling member.

10. The vehicle seat of claim 8 wherein the top end portion of the gap concealing member is disposed towards the vehicle front with respect to a vehicle rear direction end portion of the seat cushion.

\* \* \* \* \*